US011954953B2

(12) United States Patent
Rocholl et al.

(10) Patent No.: US 11,954,953 B2
(45) Date of Patent: *Apr. 9, 2024

(54) THERMAL MANAGEMENT SENSORS

(71) Applicant: Oshkosh Corporation, Oshkosh, WI (US)

(72) Inventors: Joshua D. Rocholl, Rochester, MN (US); Vince Schad, Oshkosh, WI (US); Chad K. Smith, Omro, WI (US); Reagan May, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,981

(22) Filed: Sep. 1, 2022

(65) Prior Publication Data
US 2022/0415103 A1 Dec. 29, 2022

Related U.S. Application Data

(63) Continuation of application No. 17/232,253, filed on Apr. 16, 2021, now Pat. No. 11,538,291.
(Continued)

(51) Int. Cl.
*G07C 5/08* (2006.01)
*A62C 3/07* (2006.01)
(Continued)

(52) U.S. Cl.
CPC ............. *G07C 5/0808* (2013.01); *B60Q 9/00* (2013.01); *B65F 3/02* (2013.01); *G07C 5/0816* (2013.01);
(Continued)

(58) Field of Classification Search
CPC ...... G07C 5/0808; G07C 5/0816; B60Q 9/00; B65F 3/02; B65F 2003/0279; B65F 2210/168; A62C 3/07
(Continued)

(56) References Cited

U.S. PATENT DOCUMENTS 5,171,121 A 12/1992 Smith et al.
5,645,862 A 7/1997 Sable et al.
(Continued)

FOREIGN PATENT DOCUMENTS

CA 2620365 A1 8/2007
CA 3075749 A1 3/2019
(Continued)

OTHER PUBLICATIONS

Aspirating Smoke Detectors, 2015, System Sensor, p. 7 (Year: 2015).

*Primary Examiner* — Krishnan Ramesh
(74) *Attorney, Agent, or Firm* — Foley & Lardner LLP

(57) ABSTRACT

A refuse vehicle comprising a chassis, a body assembly coupled to the chassis, the body assembly defining a refuse compartment, and a thermal event monitoring system including an air sampling line configured to capture air from the refuse compartment of the refuse vehicle and transport the air to a sensor positioned outside of the refuse compartment and a processing circuit operatively coupled to the sensor and configured to detect a thermal event indicating at least one of a fire or an overheating component based on a signal from the sensor.

20 Claims, 12 Drawing Sheets

Related U.S. Application Data

(60) Provisional application No. 63/011,332, filed on Apr. 17, 2020.

(51) Int. Cl.
*B60Q 9/00* (2006.01)
*B65F 3/02* (2006.01)

(52) U.S. Cl.
CPC ......... *A62C 3/07* (2013.01); *B65F 2003/0279* (2013.01); *B65F 2210/168* (2013.01)

(58) Field of Classification Search
USPC ...................................................... 701/29.4
See application file for complete search history.

(56) References Cited

U.S. PATENT DOCUMENTS

| | | | |
|---|---|---|---|
| 5,919,027 A | 7/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,971,694 A | 10/1999 | McNeilus et al. | |
| 5,984,609 A | 11/1999 | Bartlett | |
| 6,033,176 A | 3/2000 | Bartlett | |
| 6,062,803 A | 5/2000 | Christenson | |
| 6,089,813 A | 7/2000 | McNeilus et al. | |
| 6,120,235 A | 9/2000 | Humphries et al. | |
| 6,123,500 A | 9/2000 | McNeilus et al. | |
| 6,210,094 B1 | 4/2001 | McNeilus et al. | |
| 6,213,706 B1 | 4/2001 | Christenson | |
| 6,224,318 B1 | 5/2001 | McNeilus et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,390,758 B1 | 5/2002 | McNeilus et al. | |
| 6,446,731 B1 * | 9/2002 | Sorosky ................ B08B 15/00 169/68 | |
| 6,447,239 B2 | 9/2002 | Young et al. | |
| 6,474,928 B1 | 11/2002 | Christenson | |
| 6,565,305 B2 | 5/2003 | Schrafel | |
| 7,070,382 B2 | 7/2006 | Pruteanu et al. | |
| 7,284,943 B2 | 10/2007 | Pruteanu et al. | |
| 7,556,468 B2 | 7/2009 | Grata | |
| 7,559,735 B2 | 7/2009 | Pruteanu et al. | |
| 7,878,750 B2 | 2/2011 | Zhou et al. | |
| 7,937,194 B2 | 5/2011 | Nasr et al. | |
| 8,000,850 B2 | 8/2011 | Nasr et al. | |
| 8,182,194 B2 | 5/2012 | Pruteanu et al. | |
| 8,215,892 B2 | 7/2012 | Calliari | |
| 8,360,706 B2 | 1/2013 | Addleman et al. | |
| 8,540,475 B2 | 9/2013 | Kuriakose et al. | |
| 8,807,613 B2 | 8/2014 | Howell et al. | |
| 9,114,804 B1 | 8/2015 | Shukla et al. | |
| 9,216,856 B2 | 12/2015 | Howell et al. | |
| 9,376,102 B1 | 6/2016 | Shukla et al. | |
| 9,387,985 B2 | 7/2016 | Gillmore et al. | |
| 9,821,789 B2 | 11/2017 | Shukla et al. | |
| 9,880,581 B2 | 1/2018 | Kuriakose et al. | |
| 9,981,803 B2 | 5/2018 | Davis et al. | |
| 10,169,982 B1 * | 1/2019 | Griffith ................ G08B 29/18 | |
| 10,196,205 B2 | 2/2019 | Betz et al. | |
| 10,282,625 B1 | 5/2019 | Wengreen et al. | |
| 10,392,000 B2 | 8/2019 | Shukla et al. | |
| 10,457,533 B2 | 10/2019 | Puszkiewicz et al. | |
| D869,332 S | 12/2019 | Gander et al. | |
| 10,558,234 B2 | 2/2020 | Kuriakose et al. | |
| 10,781,090 B2 | 9/2020 | Puszkiewicz et al. | |
| D899,452 S | 10/2020 | Klimes et al. | |
| 10,800,605 B2 | 10/2020 | Rocholl et al. | |
| 10,843,379 B2 | 11/2020 | Rocholl et al. | |
| 10,858,184 B2 | 12/2020 | Betz et al. | |
| 10,858,231 B2 | 12/2020 | Holmes et al. | |
| 10,859,167 B2 | 12/2020 | Jax et al. | |
| 10,899,538 B2 | 1/2021 | Nelson et al. | |
| D910,670 S | 2/2021 | Klimes et al. | |
| 10,974,724 B1 | 4/2021 | Shively et al. | |
| 11,001,135 B2 | 5/2021 | Yakes et al. | |
| 11,001,440 B2 | 5/2021 | Rocholl et al. | |
| 11,007,863 B2 | 5/2021 | Yakes et al. | |
| 11,021,078 B2 | 6/2021 | Rocholl et al. | |
| 11,046,329 B2 | 6/2021 | Clifton et al. | |
| 11,052,899 B2 | 7/2021 | Shukla et al. | |
| 11,059,436 B2 | 7/2021 | Wildgrube et al. | |
| 11,073,838 B2 | 7/2021 | Wengreen et al. | |
| 2003/0195680 A1 | 10/2003 | Pillar | |
| 2007/0088469 A1 | 4/2007 | Schmiedel et al. | |
| 2008/0071438 A1 | 3/2008 | Nasr et al. | |
| 2012/0325502 A1 * | 12/2012 | Hennegan ............ A62C 35/62 169/37 | |
| 2013/0098365 A1 * | 4/2013 | Bohner ................ A61M 16/085 128/207.15 | |
| 2015/0091731 A1 * | 4/2015 | Drews .................... G08B 17/10 340/628 | |
| 2016/0023548 A1 | 1/2016 | Crist et al. | |
| 2016/0101306 A1 * | 4/2016 | Hennegan ............ A62C 37/36 169/17 | |
| 2017/0146287 A1 | 5/2017 | Rezayat | |
| 2017/0368390 A1 * | 12/2017 | Müller .................... A62C 3/07 | |
| 2018/0201138 A1 | 7/2018 | Yellambalase et al. | |
| 2019/0025856 A1 | 1/2019 | Turato | |
| 2019/0039407 A1 | 2/2019 | Smith | |
| 2019/0179305 A1 | 6/2019 | Magzimof et al. | |
| 2019/0185077 A1 | 6/2019 | Smith et al. | |
| 2019/0193934 A1 | 6/2019 | Rocholl et al. | |
| 2019/0258251 A1 | 8/2019 | Ditty et al. | |
| 2019/0360600 A1 | 11/2019 | Jax et al. | |
| 2020/0031332 A1 | 1/2020 | Koti et al. | |
| 2020/0039869 A1 | 2/2020 | Li | |
| 2020/0262328 A1 | 8/2020 | Nelson et al. | |
| 2020/0262366 A1 | 8/2020 | Wildgrube et al. | |
| 2020/0301413 A1 | 9/2020 | Wengreen et al. | |
| 2020/0301414 A1 | 9/2020 | Schwie et al. | |
| 2020/0316816 A1 | 10/2020 | Messina et al. | |
| 2020/0317083 A1 | 10/2020 | Messina et al. | |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346657 A1 | 11/2020 | Clifton et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0348681 A1 | 11/2020 | Clifton et al. | |
| 2020/0348764 A1 | 11/2020 | Clifton et al. | |
| 2020/0360751 A1 * | 11/2020 | Ogier .................... A62C 37/36 | |
| 2020/0398633 A1 | 12/2020 | Oh et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0398772 A1 | 12/2020 | Wildgrube et al. | |
| 2020/0398857 A1 | 12/2020 | Clifton et al. | |
| 2020/0398867 A1 | 12/2020 | Hara et al. | |
| 2020/0399057 A1 | 12/2020 | Rocholl et al. | |
| 2020/0399058 A1 | 12/2020 | Rocholl et al. | |
| 2021/0002112 A1 | 1/2021 | Puszkiewicz et al. | |
| 2021/0011161 A1 | 1/2021 | Chen et al. | |
| 2021/0031611 A1 | 2/2021 | Yakes et al. | |
| 2021/0031612 A1 | 2/2021 | Yakes et al. | |
| 2021/0031649 A1 | 2/2021 | Messina et al. | |
| 2021/0054942 A1 | 2/2021 | Jax et al. | |
| 2021/0069934 A1 | 3/2021 | Rocholl et al. | |
| 2021/0070595 A1 | 3/2021 | Holmes et al. | |
| 2021/0086991 A1 | 3/2021 | Betz et al. | |
| 2021/0197000 A1 * | 7/2021 | Kypbida ................ A62C 35/62 |

(56) References Cited

U.S. PATENT DOCUMENTS

| | | | |
|---|---|---|---|
| 2021/0206372 A1 | 7/2021 | Shively et al. | |
| 2021/0209914 A1* | 7/2021 | Katz | G06V 20/59 |
| 2021/0221216 A1 | 7/2021 | Yakes et al. | |
| 2021/0229908 A1 | 7/2021 | Rocholl et al. | |
| 2021/0327170 A1 | 10/2021 | Rocholl et al. | |
| 2023/0266756 A1 | 8/2023 | Wengreen et al. | |

FOREIGN PATENT DOCUMENTS

| | | |
|---|---|---|
| CA | 3091552 A1 | 8/2019 |
| CN | 109697822 A | 4/2019 |
| CN | 112370692 A | 2/2021 |
| DE | 10 2018 103 681 A1 | 8/2018 |
| DE | 10 2017 220 100 A1 | 5/2019 |
| DE | 10 2018 000 096 A1 | 7/2019 |
| EP | 3 321 907 A1 | 5/2018 |
| JP | 3394697 B2 | 4/2003 |
| WO | WO-2017/180365 A1 | 10/2017 |
| WO | WO-2019/055711 A1 | 3/2019 |
| WO | WO-2021/111408 A1 | 6/2021 |
| WO | WO-2021/111409 A2 | 6/2021 |

\* cited by examiner

THERMAL MANAGEMENT SENSORS

CROSS-REFERENCE TO RELATED PATENT APPLICATIONS

This patent application is a continuation of U.S. patent application Ser. No. 17/232,253, filed Apr. 16, 2021, which claims the benefit of and priority to U.S. Provisional Patent Application No. 63/011,332, filed on Apr. 17, 2020, the disclosures of which are hereby incorporated by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One implementation of the present disclosure is a refuse vehicle comprising a chassis, a body assembly coupled to the chassis, the body assembly defining a refuse compartment, and a thermal event monitoring system including an air sampling line configured to capture air from the refuse compartment of the refuse vehicle and transport the air to a sensor positioned outside of the refuse compartment and a processing circuit operatively coupled to the sensor and configured to detect a thermal event indicating at least one of a fire or an overheating component based on a signal from the sensor.

In some embodiments, the refuse vehicle further includes a user interface operatively coupled to the processing circuit, wherein the processing circuit is further configured to send an alert to an operator of the refuse vehicle via the user interface upon determining the presence of a thermal event. In some embodiments, the thermal event monitoring system further includes an air purge system configured to provide compressed air to the air sampling line to clear debris from at least one of an inside of the air sampling line or a sampling opening of the air sampling line. In some embodiments, the sensor is configured to analyze the air to detect the thermal event. In some embodiments, the thermal even monitoring system further comprises a temperature sensor operatively coupled to the processing circuit and configured to measure at least one of an air temperature or a temperature of a surface the temperature sensor is coupled to. In some embodiments, the temperature sensor is positioned in the refuse compartment. In some embodiments, the temperature sensor includes a resistance temperature detector (RTD) configured to measure a temperature associated with the refuse compartment. In some embodiments, the temperature sensor is positioned between a cab of the refuse vehicle and the refuse compartment. In some embodiments, the thermal event monitoring system further comprises a plurality of temperature sensors positioned in the refuse compartment and operatively coupled to the processing circuit, and wherein the processing circuit is further configured to determine a location of the thermal event based on measurements from the plurality of temperature sensors. In some embodiments, the refuse vehicle further includes a packer configured to compact loose refuse, wherein the processing circuit is further configured to operate the packer to smother the fire in response to determining a presence of a fire in the refuse compartment.

Another implementation of the present disclosure is a thermal event monitoring system for a refuse vehicle. The thermal event monitoring system includes an air sampling line configured to capture air from the refuse compartment of the refuse vehicle and transport the air to a sensor positioned outside of the refuse compartment of the refuse vehicle and a processing circuit comprising a processor and memory. The memory has instructions stored thereon that, when executed by the processor, cause the processing circuit to receive a signal from the sensor regarding the air and detect a thermal event indicating at least one of a fire or an overheating component based on the signal from the sensor. In some embodiments, the instructions further cause the processing circuit to alert an operator of the refuse vehicle of the thermal event via a user interface of the refuse vehicle. In some embodiments, the thermal event monitoring system, further includes an air purge system configured to provide compressed air to the air sampling line to clear debris from at least one of an inside of the air sampling line or a sampling opening of the air sampling line. In some embodiments, the thermal event monitoring system further includes a temperature sensor configured to measure at least one of an air temperature or a temperature of a surface the temperature sensor is coupled to. In some embodiments, the temperature sensor includes a resistance temperature detector (RTD) positioned to measure a temperature associated with the refuse compartment. In some embodiments, the temperature sensor is positioned between a cab of the refuse vehicle and the refuse compartment. In some embodiments, the thermal event monitoring system further includes a plurality of temperature sensors operatively coupled to the processing circuit, and wherein the instructions further cause the processing circuit to determine a location of the thermal event based on measurements from the plurality of temperature sensors. In some embodiments, the instructions further cause the processing circuit to detect the thermal event based on a rate of change in the signal from the sensor. In some embodiments, the instructions further cause the processing circuit to detect the thermal event based on the signal exceeding a predetermined threshold value. In some embodiments, the instructions further cause the processing circuit to send a message, in response to determining the presence of a fire, instructing a packer of the refuse vehicle to smother the fire.

Another implementation of the present disclosure is a refuse vehicle comprising a chassis, a body assembly coupled to the chassis, the body assembly defining a refuse compartment, and a thermal event monitoring system comprising one or more sampling elements configured to sample an environmental condition associated with a portion of the refuse vehicle and a processing circuit configured to receive a sample from the one or more sampling elements and determine a presence of a thermal event indicating at least one of a fire or an overheating component.

In some embodiments, the processing circuit is further configured to alert an operator of the refuse vehicle of the thermal event via a user interface of the refuse vehicle. In some embodiments, the one or more sampling elements include an air sampling line configured to capture air from the portion of the refuse vehicle and transport the air to a different portion of the refuse vehicle and wherein the sample for the one or more sampling elements includes the air. In some embodiments, the one or more sampling elements further include an air purge system configured to provide compressed air to the air sampling line to clear debris from at least one of an inside of the air sampling line or a sampling opening of the air sampling line. In some embodiments, the one or more sampling elements include an aspirating smoke detector positioned at the different portion of the refuse vehicle and configured to analyze the air to detect the thermal event. In some embodiments, the one or more sampling elements include a temperature sensor configured to measure at least one of an air temperature or a temperature of a surface the temperature sensor is coupled to and wherein the sample from the one or more sampling elements includes a temperature measurement. In some embodiments, the temperature sensor is positioned in an engine compartment of the refuse vehicle and configured to measure a temperature associated with a prime mover of the refuse vehicle. In some embodiments, the temperature sensor is positioned to measure a temperature associated with a battery of the refuse vehicle. In some embodiments, the temperature sensor includes a resistance temperature detector (RTD) positioned to measure a temperature associated with a refuse compartment of the refuse vehicle. In some embodiments, the temperature sensor is positioned between a cab of the refuse vehicle and the refuse compartment.

Another implementation of the present disclosure is a thermal event monitoring system for a refuse vehicle comprising a sampling element configured to sample an environmental condition associated with a portion of the refuse vehicle and a processing circuit comprising a processor and memory, the memory having instructions stored thereon that, when executed by the processor, cause the processing circuit to receive a sample from the sampling element, and determine a presence of a thermal event indicating at least one of a fire or an overheating component.

In some embodiments, the instructions further cause the processing circuit to alert an operator of the refuse vehicle of the thermal event via a user interface of the refuse vehicle. In some embodiments, the sampling element includes an air sampling line configured to capture air from the portion of the refuse vehicle and transport the air to a different portion of the refuse vehicle and wherein the sample of the sampling element includes the air. In some embodiments, the sampling element further includes an air purge system configured to provide compressed air to the air sampling line to clear debris from at least one of an inside of the air sampling line or a sampling opening of the air sampling line. In some embodiments, the sampling element includes an aspirating smoke detector positioned at the different portion of the refuse vehicle and configured to analyze the air to detect the thermal event. In some embodiments, the sampling element includes a temperature sensor configured to measure at least one of an air temperature or a temperature of a surface the temperature sensor is coupled to and wherein the sample from the sampling element includes a temperature measurement. In some embodiments, the temperature sensor is positioned in an engine compartment of the refuse vehicle and configured to measure a temperature associated with a prime mover of the refuse vehicle. In some embodiments, the temperature sensor is positioned to measure a temperature associated with a battery of the refuse vehicle. In some embodiments, the temperature sensor includes a resistance temperature detector (RTD) positioned to measure a temperature associated with a refuse compartment of the refuse vehicle. In some embodiments, the temperature sensor is positioned between a cab of the refuse vehicle and the refuse compartment.

Another implementation of the present disclosure is a refuse vehicle comprising a chassis, a body assembly coupled to the chassis, the body assembly defining a refuse compartment, and a thermal event monitoring system comprising a sampling element configured to detect a thermal event associated with the refuse vehicle indicating at least one of a fire or an overheating component and transmit a notification in response to detecting the thermal event.

In some embodiments, transmitting the notification includes transmitting an indication of the thermal event to at least one of an emergency response team or a fleet management system, wherein the indication includes a GPS location of the refuse vehicle. In some embodiments, transmitting the notification includes alerting an operator of the refuse vehicle of the thermal event via a user interface of the refuse vehicle. In some embodiments, the sampling element includes at least one of an aspirating smoke detector or a resistance temperature detector. In some embodiments, transmitting the notification includes transmitting data via telematics to an external computing system. In some embodiments, transmitting the data via telematics includes updating a virtual refuse vehicle model stored by the external computing system. In some embodiments, transmitting the notification includes transmitting an alarm to an external fire suppression system of a space the refuse vehicle is located in, wherein the alarm causes the external fire suppression system to perform a fire suppression action.

Another implementation of the present disclosure is a telematics system for a refuse vehicle comprising a processing circuit including a processor and memory, the memory having instructions stored thereon that, when executed by the processor, cause the processing circuit to receive a sensor measurement from a sensor coupled to the refuse vehicle, detect, based on the sensor measurement, a thermal event associated with the refuse vehicle indicating at least one of a fire or an overheating component, and transmit a notification in response to detecting the thermal event.

In some embodiments, transmitting the notification includes transmitting an indication of the thermal event to at least one of an emergency response team or a fleet management system, wherein the indication includes a GPS location of the refuse vehicle. In some embodiments, transmitting the notification includes alerting an operator of the refuse vehicle of the thermal event via a user interface of the refuse vehicle. In some embodiments, the sensor includes at least one of an aspirating smoke detector or a resistance temperature detector. In some embodiments, transmitting the notification includes transmitting data via telematics to an external computing system. In some embodiments, transmitting the data via telematics includes updating a virtual refuse vehicle model stored by the external computing system. In some embodiments, transmitting the notification includes transmitting an alarm to an external fire suppression system of a space the refuse vehicle is located in, wherein the alarm causes the external fire suppression system to perform a fire suppression action.

Another implementation of the present disclosure is a fleet management system for managing one or more refuse vehicles comprising a database storing a virtual representation of each of the one or more refuse vehicles, a processing system configured to communicate with the one or more refuse vehicles via one or more transceivers integrated with the one or more refuse vehicles, and one or more computing devices integrated with the one or more refuse vehicles, each of the one or more computing devices configured to receive a sensor measurement from a sensor coupled to a refuse vehicle of the one or more refuse vehicles, detect, based on the sensor measurement, a thermal event associated with the refuse vehicle indicating at least one of a fire or an overheating component, and in response to detecting the thermal event, cause a transceiver of the one or more transceivers to transmit a notification of the thermal event to the processing system.

In some embodiments, causing the transceiver to transmit the notification includes transmitting an indication of the thermal event to an emergency response team, wherein the indication includes a GPS location of the refuse vehicle. In some embodiments, each of the one or more computing devices are further configured to cause a user interface of the refuse vehicle to alert an operator of the refuse vehicle of the thermal event. In some embodiments, the sensor includes at least one of an aspirating smoke detector or a resistance temperature detector. In some embodiments, in response to receiving the notification, the processing system is configured to update the virtual representation of a refuse vehicle of the one or more refuse vehicles to include an indication of the thermal event. In some embodiments, causing the transceiver to transmit the notification includes transmitting an alarm to an external fire suppression system of a space the refuse vehicle is located in, wherein the alarm causes the external fire suppression system to perform a fire suppression action.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1A:
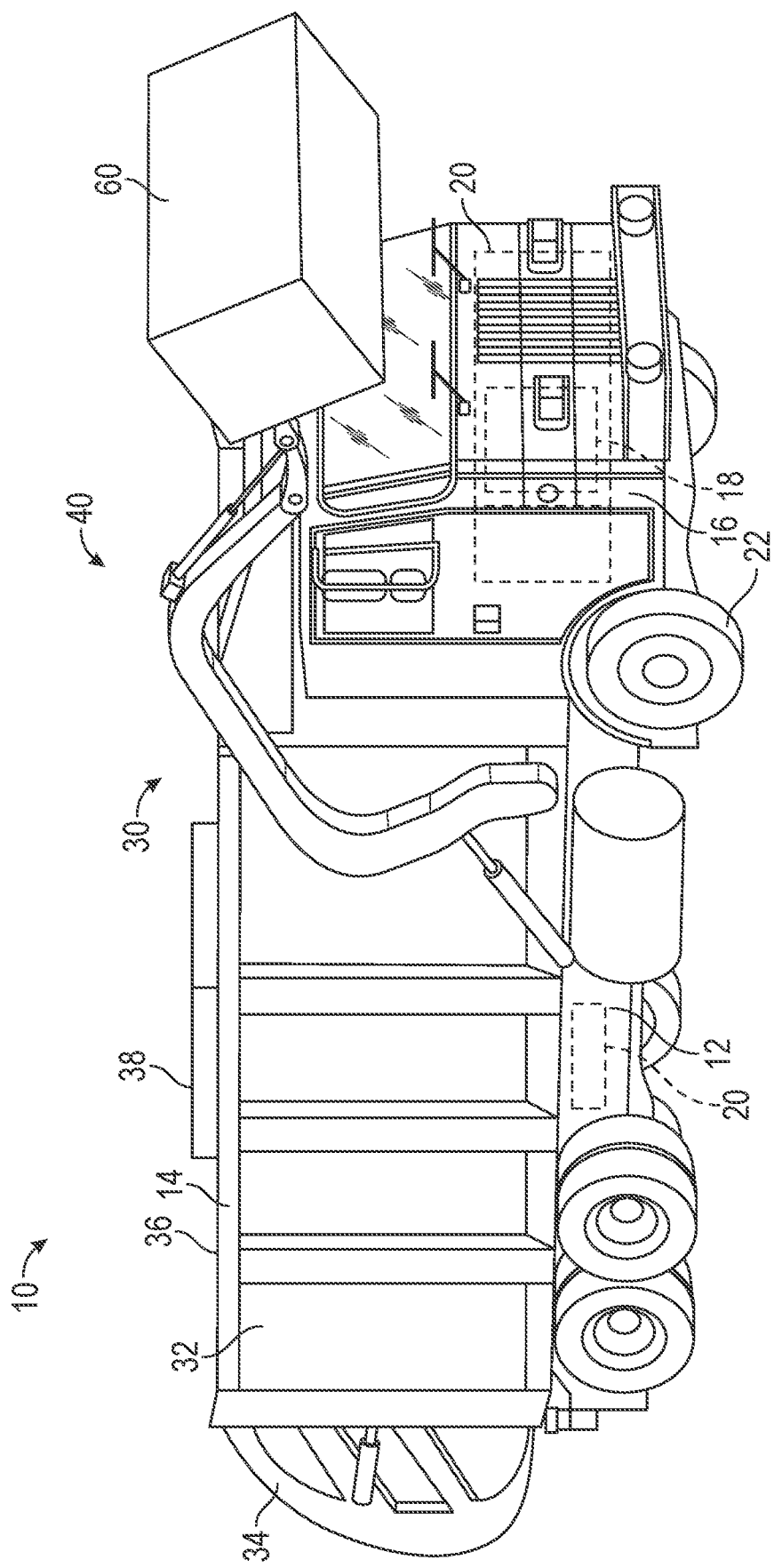
FIG. 1A is a perspective view of a refuse vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a thermal event monitoring system for refuse vehicles is disclosed herein. The thermal event monitoring system may monitor a body of a refuse vehicle and/or an environment of the refuse vehicle to detect thermal events (e.g., excess heat generation, flames, etc.) and may generate alerts based on the detected thermal events. For example, the thermal event monitoring system may detect a flame in a refuse compartment of a refuse vehicle and alert an operator of the refuse vehicle of the flame. As another example, the thermal event monitoring system may detect unexpected heat in an engine compartment and/or a battery system of the refuse vehicle that indicates a problem and transmit a telematics alert to a vehicle management system. In various embodiments, the thermal event monitoring system includes sensors positioned around a body of the refuse vehicle. For example, the thermal event monitoring system may include spot heat detectors. Additionally or alternatively, the thermal event monitoring system may include linear heat detectors. In some embodiments, the thermal event monitoring system includes an aspirating smoke detector. For example, the thermal event monitoring system may include various air sampling passages (e.g., tubes, pipes, etc.) configured to sample air from within a refuse compartment of the refuse vehicle and transport the air to an aspirating smoke detector for detection. In various embodiments, the sensors of the thermal event monitoring system are positioned on an outside surface of the refuse vehicle body, thereby protecting the sensors from potentially damaging materials inside the refuse vehicle body (e.g., caustic refuse inside a refuse compartment, etc.). Additionally or alternatively, the sensors of the thermal event monitoring system may be positioned within the refuse vehicle (e.g., integrated within a sidewall of a refuse compartment of the refuse vehicle, etc.).

In various embodiments, the thermal event monitoring system facilitates alert generation. For example, in response to detecting a thermal event (e.g., a hot spot, excess heat, a flame, etc.), the thermal event monitoring system may display a graphic on a user interface. As another example, in response to detecting a thermal event the thermal event monitoring system may flash an indicator light (e.g., an LED, etc.) and/or generate an audio alert. As yet another example, in response to detecting a thermal event the thermal event monitoring system may transmit a telematics notification, including context information relating to the thermal event, to an external system such as a vehicle management system/fleet management system. In some embodiments, the thermal event monitoring system may facilitate rerouting the refuse vehicle to a safe location. For example, in response to detecting a thermal event, the thermal event monitoring system may generate a navigational route for the refuse vehicle to direct the refuse vehicle to a service location. In some embodiments, the thermal event monitoring system facilitates alerting external systems. For example, in response to detecting a thermal event, the thermal event monitoring system may transmit a GPS location to a fleet management system. As an additional example, the thermal event monitoring system may also transmit a GPS location to an emergency response team (e.g., a 911 operator, etc.).

Overall Vehicle

As shown in FIG. 1A, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1A, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1A, the refuse vehicle 10 includes a prime mover, shown as motor 18. In various embodiments, motor 18 is disposed within a compartment such as engine compartment 20. In some embodiments, the prime mover is or includes an internal combustion engine. According to the exemplary embodiment shown in FIG. 1A, the motor 18 is coupled to the frame 12 at a position beneath the cab 16. The motor 18 is configured to provide power to a plurality of tractive elements, shown as wheels 22 (e.g., via a drive shaft, axles, etc.). In other embodiments, the motor 18 is otherwise positioned. In some embodiments, the refuse vehicle 10 includes a plurality of other motors (e.g., electric motors, etc.) to facilitate independently driving one or more of the wheels 22. In still other embodiments, the motor 18 or a secondary motor is coupled to and configured to drive a hydraulic system that powers hydraulic actuators.

In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to power the motor 18, power actuators, and/or power the other accessories (e.g., a hybrid refuse vehicle, etc.). For example, the refuse vehicle 10 may have an electric motor augmented by the motor 18 (e.g., a combustion engine) to cooperatively provide power to the wheels 22.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1A, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1A, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1A, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1A, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.). In various embodiments, the thermal event monitoring system of the present disclosure is usable with other vehicles such as mixers, utility vehicles, and/or the like, as described below with reference to FIG. 1B.

Figure 1B:
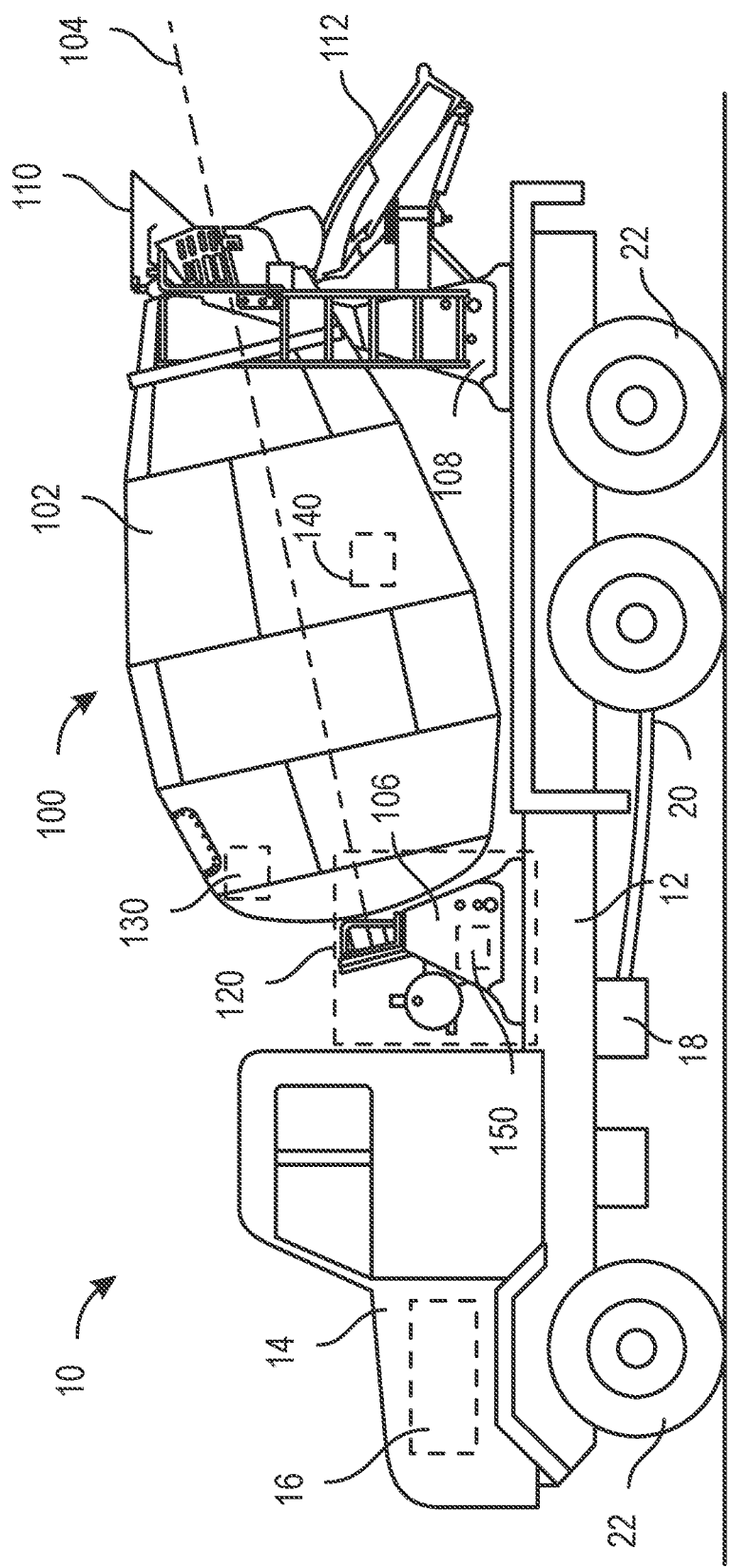
FIG. 1B is a perspective view of a rear discharge mixer, according to an exemplary embodiment.

According to the exemplary embodiment shown in FIG. 1B, a vehicle, shown as concrete mixing truck 100, includes a drum assembly, shown as drum assembly 110, and a control system, shown as drum control system 150. According to an exemplary embodiment, the concrete mixing truck 100 is configured as a rear-discharge concrete mixing truck. In other embodiments, the concrete mixing truck 100 is configured as a front-discharge concrete mixing truck. As shown in FIG. 1B, the concrete mixing truck 100 includes a chassis, shown as frame 102, a cab, shown as cab 104, coupled to the frame 102 (e.g., at a front end thereof, etc.). The drum assembly 110 is coupled to the frame 102 and disposed behind the cab 104 (e.g., at a rear end thereof, etc.), according to the exemplary embodiment shown in FIG. 1B. In other embodiments, at least a portion of the drum assembly 110 extends in front of the cab 104. The cab 104 may include various components to facilitate operation of the concrete mixing truck 100 by an operator (e.g., a seat, a steering wheel, hydraulic controls, a user interface, switches, buttons, dials, etc.).

As shown in FIG. 1B, the concrete mixing truck 100 includes a prime mover, shown as engine 106. As shown in FIG. 1B, the engine 106 is coupled to the frame 102 at a position beneath the cab 104. The engine 106 may be configured to utilize one or more of a variety of fuels (e.g., gasoline, diesel, bio-diesel, ethanol, natural gas, etc.), according to various exemplary embodiments. According to an alternative embodiment, the engine 106 additionally or alternatively includes one or more electric motors coupled to the frame 102 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 100.

As shown in FIG. 1B, the concrete mixing truck 100 includes a power transfer device, shown as transmission 108. In various embodiments, the engine 106 is coupled to the transmission 108. In one embodiment, the engine 106 produces mechanical power (e.g., due to a combustion reaction, etc.) that flows into the transmission 108. As shown in FIG. 1B, the concrete mixing truck 100 includes a first drive system, shown as vehicle drive system 120, that is coupled to the transmission 108. The vehicle drive system 120 may include drive shafts, differentials, and other components coupling the transmission 108 with a ground surface to move the concrete mixing truck 100. As shown in FIG. 1B, the concrete mixing truck 100 includes a plurality of tractive elements, shown as wheels 122, that engage a ground surface to move the concrete mixing truck 100. In one embodiment, at least a portion of the mechanical power produced by the engine 106 flows through the transmission 108 and into the vehicle drive system 120 to power at least a portion of the wheels 122 (e.g., front wheels, rear wheels, etc.). In one embodiment, energy (e.g., mechanical energy, etc.) flows along a first power path defined from the engine 106, through the transmission 108, and to the vehicle drive system 120.

As shown in FIG. 1B, the drum assembly 110 of the concrete mixing truck 100 includes a drum, shown as mixing drum 112. The mixing drum 112 is coupled to the frame 102 and disposed behind the cab 104 (e.g., at a rear and/or middle of the frame 102, etc.). As shown in FIG. 1B, the drum assembly 110 includes a second drive system, shown as drum drive system 130, that is coupled to the frame 102. The concrete mixing truck 100 includes a first support, shown as front pedestal 160, and a second support, shown as rear pedestal 180. According to an exemplary embodiment, the front pedestal 160 and the rear pedestal 180 cooperatively couple (e.g., attach, secure, etc.) the mixing drum 112 to the frame 102 and facilitate rotation of the mixing drum 112 relative to the frame 102. In an alternative embodiment, the drum assembly 110 is configured as a stand-alone mixing drum that is not coupled (e.g., fixed, attached, etc.) to a vehicle. In such an embodiment, the drum assembly 110 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIG. 1B, the mixing drum 112 defines a central, longitudinal axis, shown as axis 118. According to an exemplary embodiment, the drum drive system 130 is configured to selectively rotate the mixing drum 112 about the axis 118. As shown in FIG. 1B, the axis 118 is angled relative to the frame 102 such that the axis 118 intersects with the frame 102. According to an exemplary embodiment, the axis 118 is elevated from the frame 102 at an angle in the range of five degrees to twenty degrees. In other embodiments, the axis 118 is elevated by less than five degrees (e.g., four degrees, three degrees, etc.) or greater than twenty degrees (e.g., twenty-five degrees, thirty degrees, etc.). In an alternative embodiment, the concrete mixing truck 100 includes an actuator positioned to facilitate selectively adjusting the axis 118 to a desired or target angle (e.g., manually in response to an operator input/command, automatically according to a control scheme, etc.).

As shown in FIG. 1B, the mixing drum 112 of the drum assembly 110 includes an inlet, shown as hopper 140, and an outlet, shown as chute 142. According to an exemplary embodiment, the mixing drum 112 is configured to receive a mixture, such as a concrete mixture (e.g., cementitious material, aggregate, sand, etc.), with the hopper 140. As shown in FIG. 1B, the mixing drum 112 includes a port, shown as injection port 114. The injection port 114 may provide access into the interior of the mixing drum 112 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port 114 includes an injection valve that facilitates injecting the water and/or the chemicals from a fluid reservoir (e.g., a water tank, etc.) into the mixing drum 112 to interact with the mixture, while preventing the mixture within the mixing drum 112 from exiting the mixing drum 112 through the injection port 114. In some embodiments, the mixing drum 112 includes multiple injection ports 114 (e.g., two injection ports, three injection ports, etc.) configured to facilitate independently injecting different water and/or chemicals into the mixing drum 112. The mixing drum 112 may include a mixing element (e.g., fins, etc.) positioned within the interior thereof. The mixing element may be configured to (i) agitate the contents of mixture within the mixing drum 112 when the mixing drum 112 is rotated by the drum drive system 130 in a first direction (e.g., counterclockwise, clockwise, etc.) and (ii) drive the mixture within the mixing drum 112 out through the chute 142 when the mixing drum 112 is rotated by the drum drive system 130 in an opposing second direction (e.g., clockwise, counterclockwise, etc.).

Thermal Event Monitoring System

Referring now to FIGS. 2A-2F, various implementations of refuse vehicle 10 equipped with a thermal event monitoring system are shown, according to a number of exemplary embodiments. It should be understood that while the thermal event monitoring system of the present disclosure is described in relation to refuse vehicle 10 it is also usable with other vehicles (e.g., trucks, semi-trailers, construction equipment, etc.). For example, the thermal event monitoring system may be used with a utility vehicle and/or a mixer (e.g., concrete mixing truck 100, etc.). In various embodiments, refuse vehicle 10 equipped with the thermal event monitoring system includes sensor(s) 210. Sensor(s) 210 may include heat detectors, flame detectors, linear heat detectors, aspirating smoke detector, thermal imaging devices, a photoelectric device, and/or the like. In some embodiments, sensor(s) 210 include an image capture device. For example, sensor(s) 210 may include a video camera and associated software component for identifying a flame in an image of the video camera. In some embodiments, sensor(s) 210 include a processing circuit. In various embodiments, sensor(s) 210 are positioned around body 14 of refuse vehicle 10. For example, sensor(s) 210 may be positioned on an outside surface of refuse compartment 30. In some embodiments, sensor(s) 210 are positioned elsewhere. For example, sensor(s) 210 may be positioned in a wheel well, battery compartment, or engine compartment of refuse vehicle 10. In various embodiments, sensor(s) 210 are positioned as to be safe from damage. For example, sensor(s) 210 may be positioned inside of refuse compartment 30 but away from refuse that might damage sensor(s) 210. In some embodiments, sensor(s) 210 include protective elements. For example, sensor(s) 210 may include a protective housing to protect sensor(s) 210 from caustic refuse in refuse compartment 30.

Figure 2A:
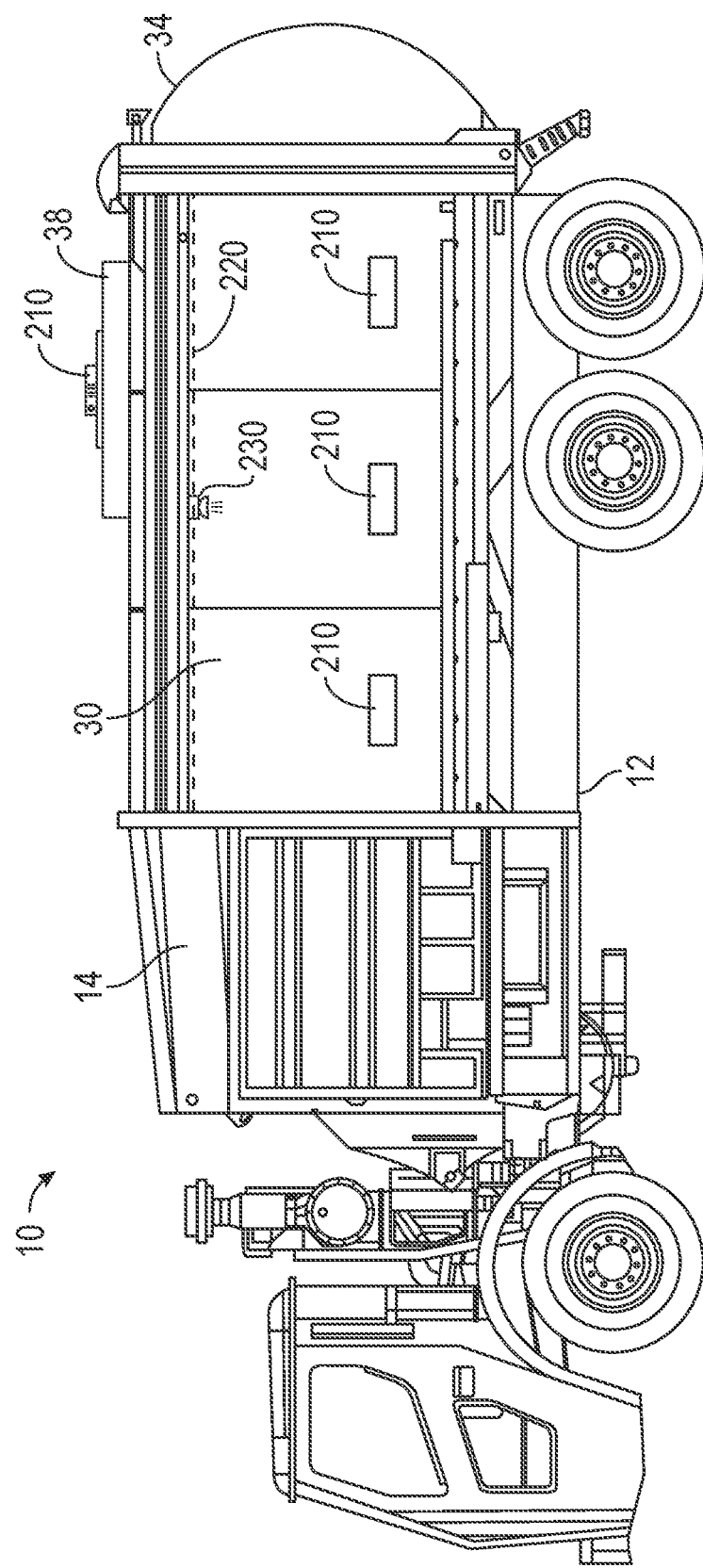
FIGS. 2A-2F are a number of views of the refuse vehicle of FIG. 1 having a thermal management system, according to various exemplary embodiments.

As shown in FIG. 2A, sensor(s) 210 are positioned on an outside surface of panels 32 and on top door 38. For example, sensor(s) 210 may include an aspirating smoke detector configured to sample air exiting refuse compartment 30 through top door 38 (e.g., as shown in FIG. 2A, etc.). As an additional example, sensor(s) 210 may be positioned on a packer, tailgate 34, and/or floor of refuse compartment 30. However, it should be understood that sensor(s) 210 may be positioned anywhere on refuse vehicle 10. In some embodiments, the thermal event monitoring system includes air sampling passage 220. Air sampling passage 220 may sample air from within refuse compartment 30 and transport the sampled air to an aspirating smoke detector. In various embodiments, air sampling passage 220 is or includes pipe, conduit, tubing, and/or the like. For example, air sampling passage 220 may be a steel pipe, an aluminum pipe, a copper pipe, a plastic pipe, and/or the like. In various embodiments, air sampling passage 220 is positioned around a top perimeter of refuse compartment 30. However, air sampling passage 220 may be positioned elsewhere. In various embodiments, sensor(s) 210 are configured to purge air sampling passage 220 of obstructions. For example, an aspirating smoke detector may force pressurize air through air sampling passage 220 to dislodge obstructions (e.g., stray refuse, liquid, etc.).

In some embodiments, refuse vehicle 10 includes fire suppression component 230. In various embodiments, the thermal event monitoring system may be configured to operate fire suppression component 230. For example, the thermal event monitoring system may detect the presence of a thermal event (e.g., via sensor(s) 210, etc.) and may operate fire suppression component 230 to nullify the thermal event (e.g., spray water on a flame, etc.). Fire suppression component 230 may be a fire sprinkler, a gaseous agent dispenser, a chemical agent dispenser, and/or the like. In various embodiments, fire suppression component 230 is positioned within refuse compartment 30, thereby facilitating fire suppression associated with thermal events within refuse compartment 30.

Figure 2B:
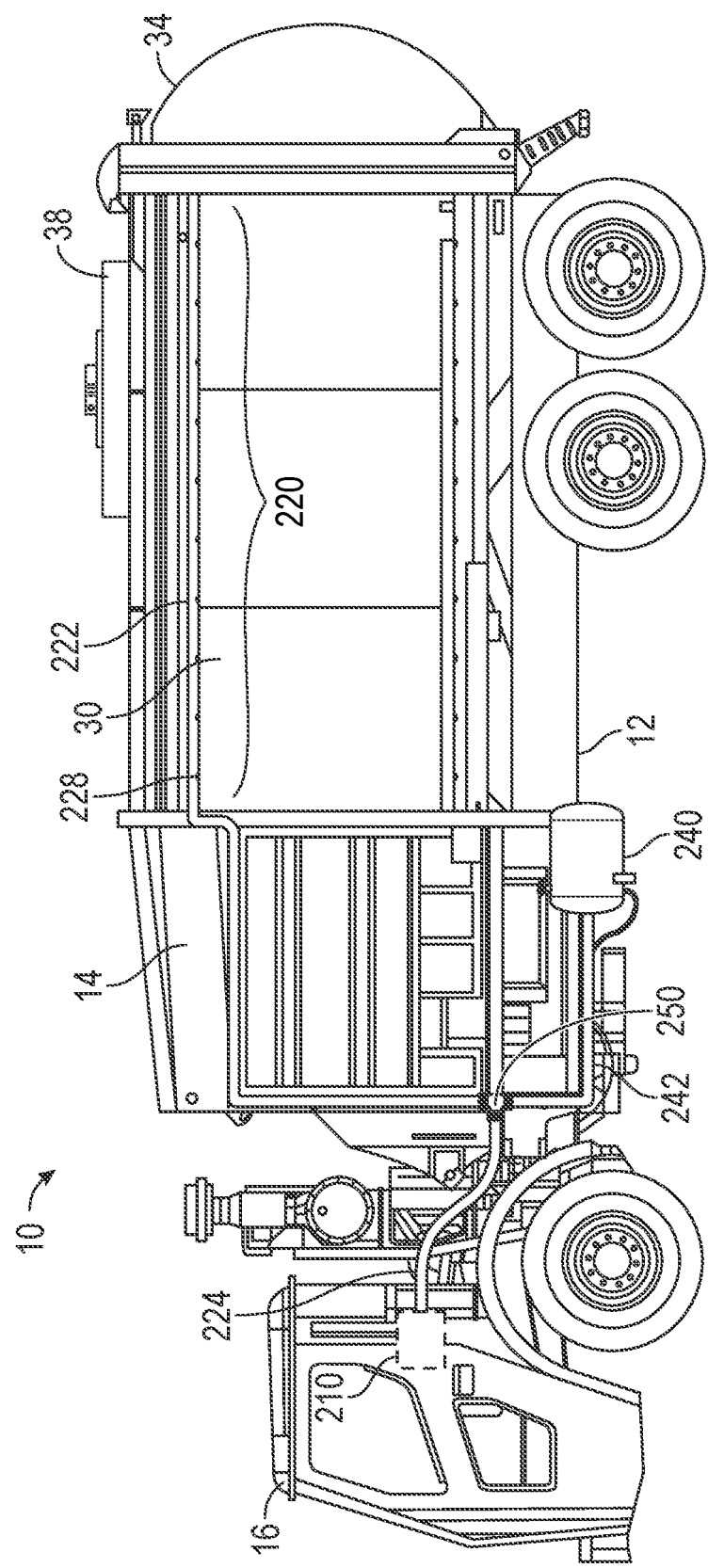

Referring now specifically to FIG. 2B, an implementation of the thermal event monitoring system of refuse vehicle 10 is shown, according to an exemplary embodiment. The thermal event monitoring system may include one or more sensor(s) 210 positioned in the cab 16. For example, the one or more sensor(s) 210 may include an aspirating smoke detector positioned within an engine tunnel of the cab 16. In various embodiments, sensor(s) 210 sample an environment of refuse compartment 30 via air sampling passage 220. Air sampling passage 220 may include first portion 222 and/or second portion 224. In various embodiments, first portion 222 is or includes a first type of air passage such as a rigid pipe network (e.g., constructed of steel, etc.). Second portion 224 may be or include a second type of air passage such as flexible piping (e.g., constructed of polyethylene, etc.). In various embodiments, first portion 222 and/or second portion 224 are coupled to refuse vehicle 10. For example, first portion 222 may be coupled to an interior portion of refuse compartment 30 (e.g., via routing clamps, etc.) and may transition to an exterior portion of refuse compartment 30. In some embodiments, first portion 222 includes one or more sampling elements shown as apertures 228. Apertures 228 may include one or more holes through which a medium such as air may flow between an outside of air sampling passage 220 and an inside of air sampling passage 220. In some embodiments, apertures 228 include protective elements configured to prevent blockage of apertures 228 (e.g., by debris, etc.). In some embodiments, the thermal event monitoring system samples ambient air from a portion of refuse vehicle 10, such as from refuse compartment 30, via apertures 228 and transports the sampled air via air sampling passage 220 to sensor(s) 210 for analysis.

In some embodiments, the thermal event monitoring system includes a purging system. For example, air sampling passage 220 may include a purging system coupled thereto that is configured to clear obstructions effecting a sampling of air. The purging system may be coupled to air sampling passage 220 via junction 250. In various embodiments, junction 250 includes one or more valves such as solenoid valves configures to control a flow of a medium such as air through the purging system and/or air sampling passage 220. In various embodiments, the purging system includes a tank, shown as air tank 240, which supplies a medium such as air to junction 250 via passage 242. Air tank 240 may include a pressure vessel configured to store pressurized gas and supply the pressurized gas to air sampling passage 220 to blow out any obstructions within air sampling passage 220. In various embodiments, air tank 240 is an existing air tank of refuse vehicle 10 (e.g., used to supply pneumatic power for components of refuse vehicle 10, etc.). In various embodiments, sensor(s) 210 and/or the purging system detect an obstruction within air sampling passage 220 (e.g., by measuring a lower than expected flow rate, etc.) and operate junction 250 to deliver a burst of air from air tank 240 to air sampling passage 220 to clear the obstruction. Additionally or alternatively, sensor(s) 210 and/or the purging system may purge air sampling passage 220 periodically. In should be understood that while air tank 240 is described in reference to supplying pressurized air to air sampling passage 220, air tank 240 may include other mediums such as a fire suppressant (e.g., water, etc.) and may deliver the medium to refuse compartment 30 in a similar fashion (e.g., via air sampling passage 220 in response to detecting a fire, etc.).

Figure 2C:
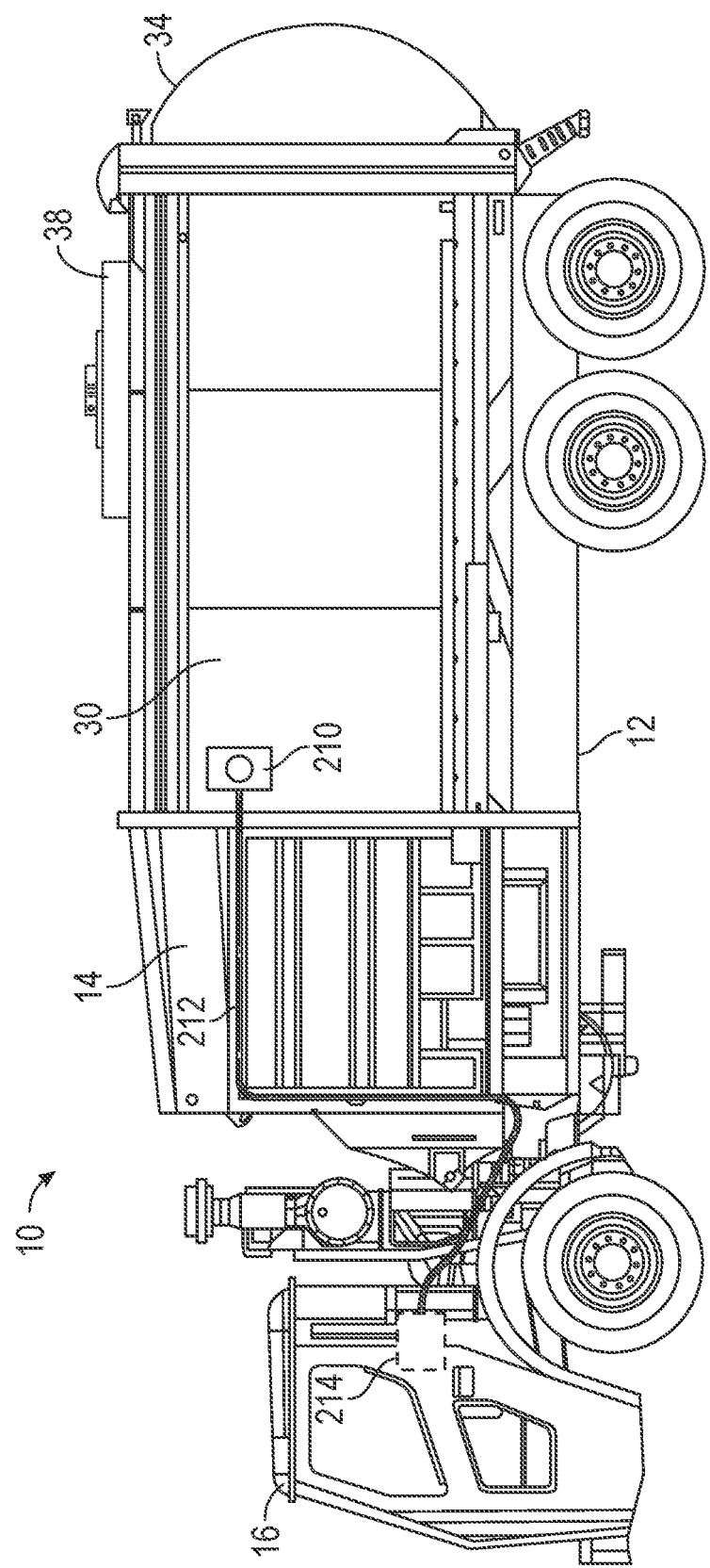

Referring now specifically to FIG. 2C, another implementation of the thermal event monitoring system of refuse vehicle 10 is shown, according to an exemplary embodiment. The thermal event monitoring system may include sensor(s) 210 positioned on a wall of refuse compartment 30. In some embodiments, sensor(s) 210 include a temperature sensor such as a resistance temperature detector (RTD) sensor. For example, sensor(s) 210 may include a RTD sensor embedded in a sidewall of refuse compartment 30. In various embodiments, a processing circuit, shown as controller 214, is coupled to sensor(s) 210 via wiring 212. Wiring 212 may transmit a signal from sensor(s) 210 to controller 214 (e.g., an electrical signal associated with a temperature measurement, etc.). Controller 214 may receive a measurement from sensor(s) 210 and analyze the measurement to determine an environmental condition (e.g., a temperature, etc.) associated with a portion of refuse vehicle 10. For example, controller 214 may determine a temperature of an interior of refuse compartment 30 by measuring a temperature of a sidewall of refuse compartment 30. In various embodiments, controller 214 is positioned in cab 16. For example, controller 214 may be positioned within an engine tunnel of cab 16.

Figure 2D:
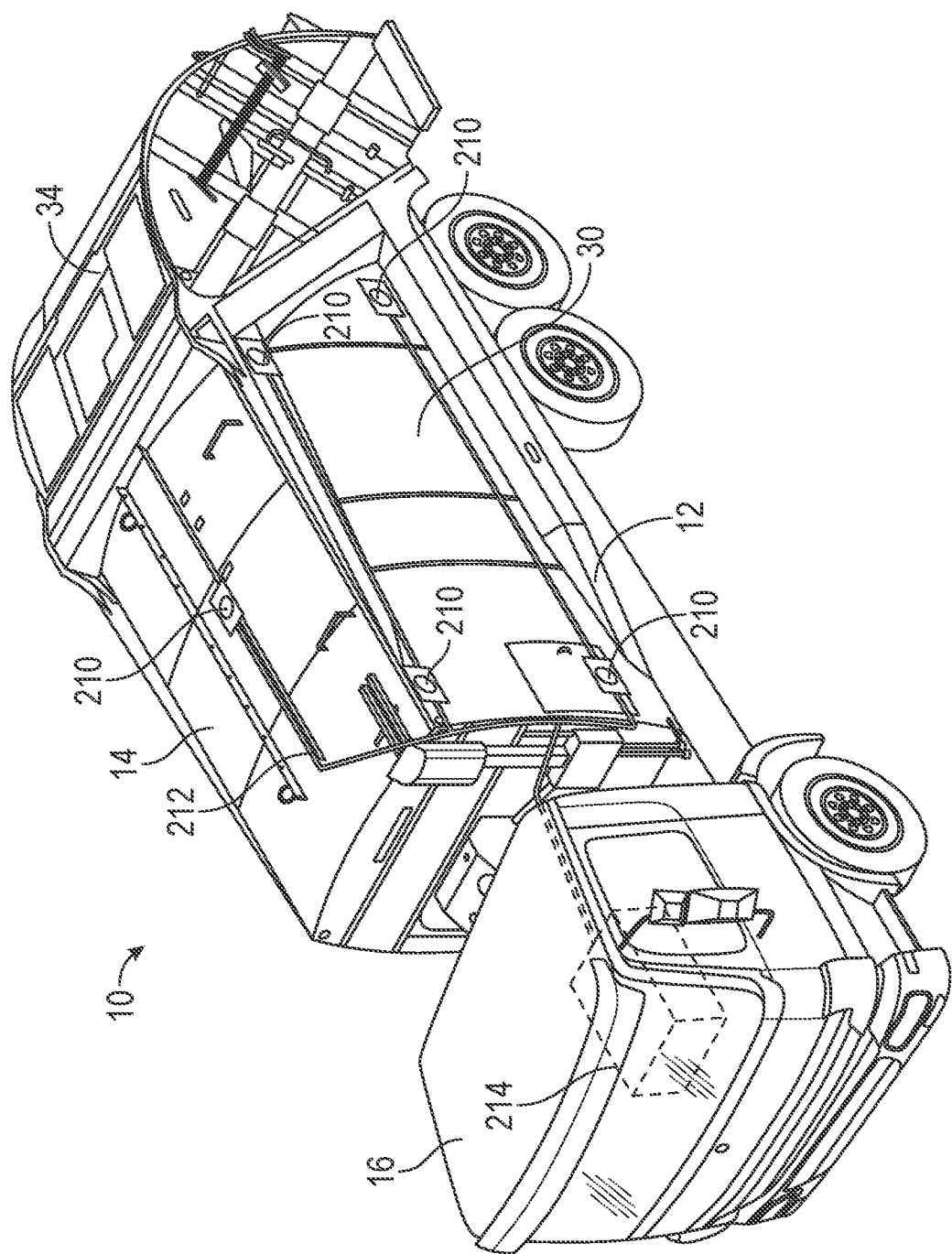

In various embodiments, controller 214 is connected to a number of sensor(s) 210 and may identify a position of a thermal event. For example, controller 214 may receive temperature measurements from a number of locations around refuse compartment 30 and may pinpoint a location of a fire to a rear quarter left section of refuse compartment 30 based on the temperature measurements. As another example, FIG. 2D illustrates sensor(s) 210 distributed about refuse compartment 30, according to an exemplary embodiment. As shown, a first one of sensor(s) 210 may be positioned on a top and center of refuse compartment 30 ceiling, a second one of sensor(s) 210 may be positioned on a top front section of the sidewall of refuse compartment 30, a third one of sensor(s) 210 may be positioned on a top rear section of the sidewall of refuse compartment 30, a fourth one of sensor(s) 210 may be positioned on a bottom front section of the sidewall of refuse compartment 30, and a fifth one of sensor(s) 210 may be positioned on a bottom rear section of the sidewall of refuse compartment 30. It should be understood that sensor(s) 210 may be positioned on an interior, exterior, and/or embedded within refuse vehicle 10. For example, sensor(s) 210 may be positioned within a sidewall of refuse compartment 30.

Figure 2E:
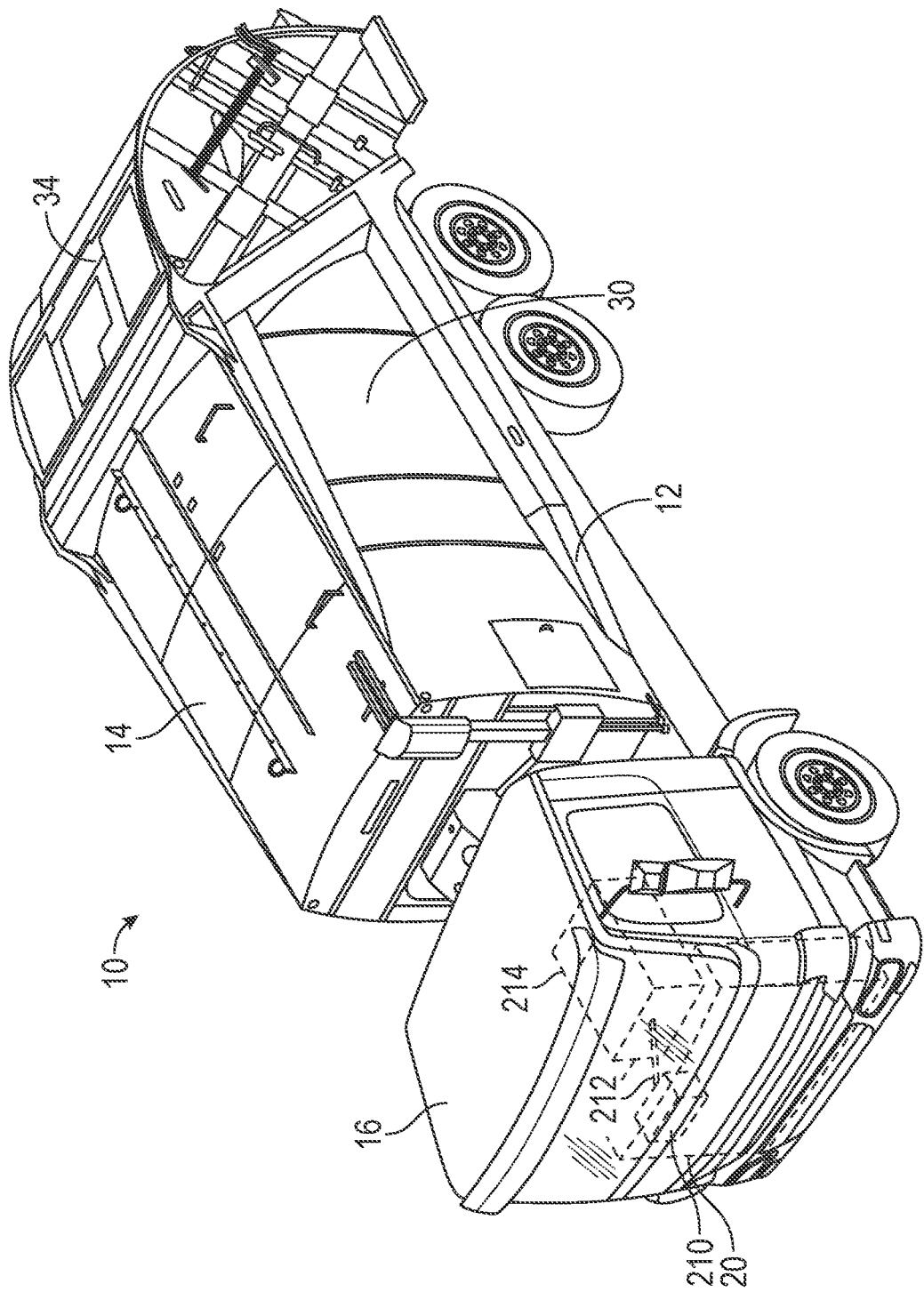
Figure 2F:
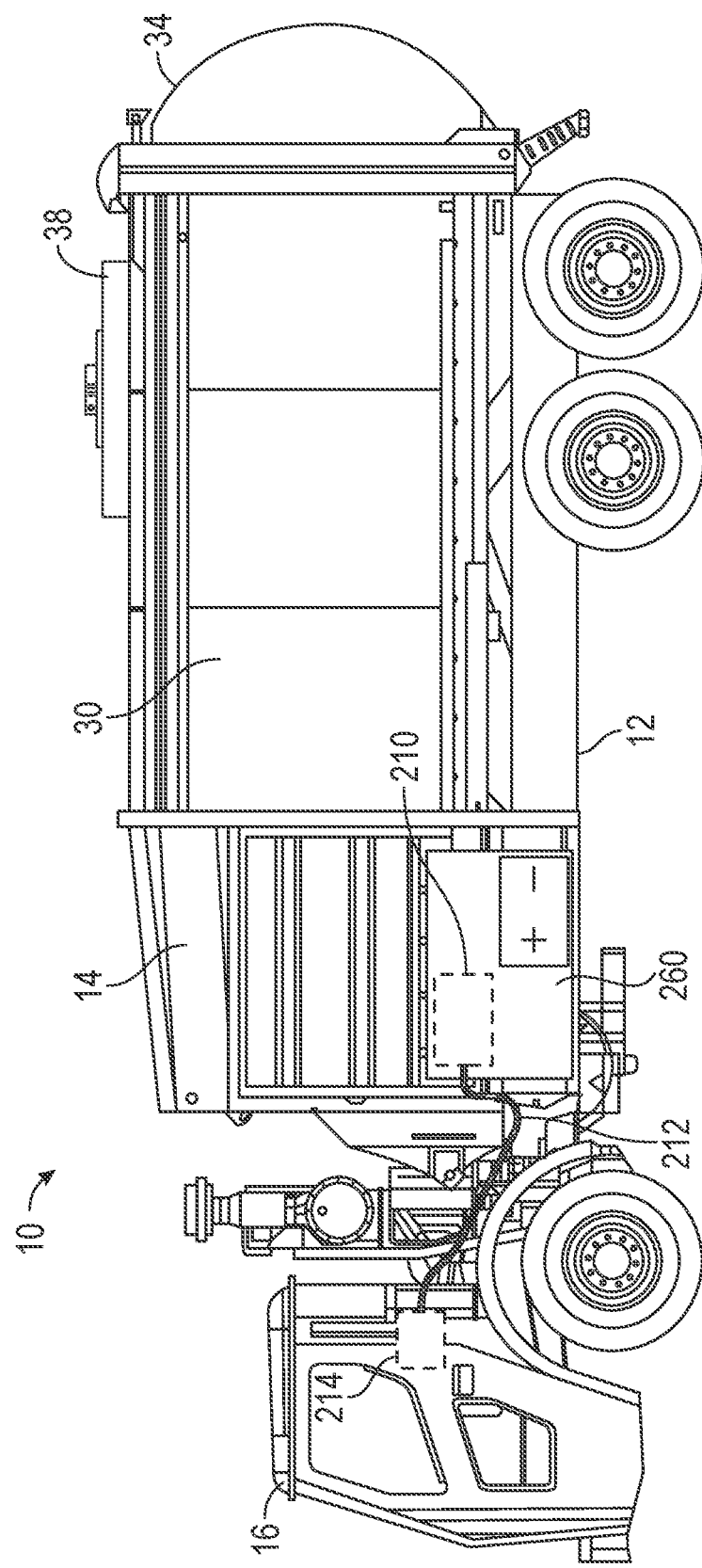

Referring now specifically to FIG. 2E, another implementation of the thermal event monitoring system of refuse vehicle 10 is shown, according to an exemplary embodiment. In some embodiments, the thermal event monitoring system includes sensor(s) 210 positioned within engine compartment 20. For example, sensor(s) 210 may include a spot heat detector positioned to monitor one or more characteristics, such as temperature, of one or more components of motor 18. Sensor(s) 210 may measure a temperature of motor 18 and transmit the temperature measurement to controller 214 via wiring 212. Controller 214 may analyze the temperature measurement to identify any thermal events associated with motor 18. Additionally or alternatively, sensor(s) 210 may be positioned elsewhere on refuse vehicle 10. For example, as shown in FIG. 2F, sensor(s) 210 may be positioned to monitor an electrical component, shown as battery 260, of refuse vehicle 10. In various embodiments, sensor(s) 210 include temperature sensors, voltage sensors, current sensors, and/or battery health sensors. For example, sensor(s) 210 may include a number of sensors configured to measure voltage, temperature, and current of a number of batteries connected in parallel. In some embodiments, sensor(s) 210 include a stand-alone battery monitor. Additionally or alternatively, sensor(s) 210 may include a dual current sensor.

Figure 3:
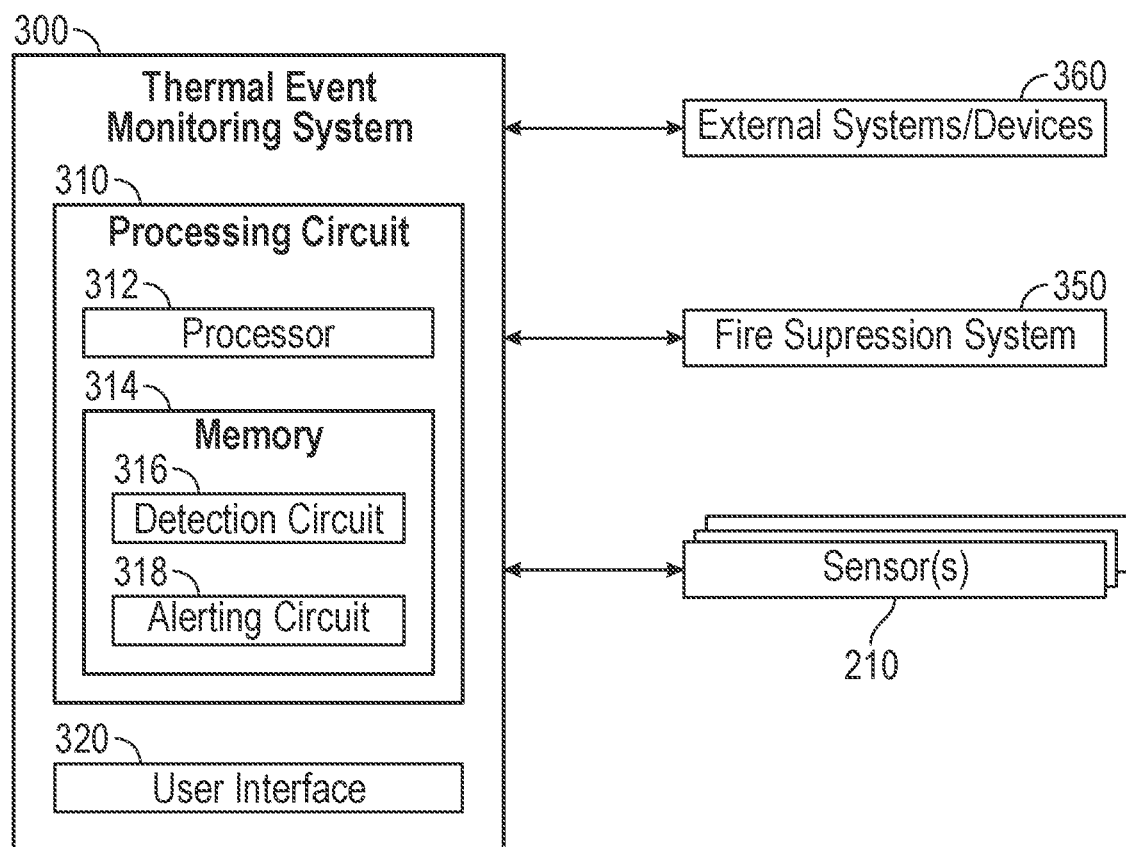
FIG. 3 is a block diagram of the thermal management system of FIG. 2, according to an exemplary embodiment.

Referring now to FIG. 3, thermal event monitoring system 300 is shown, according to an exemplary embodiment. In various embodiments, thermal event monitoring system 300 is configured to detect thermal events associated with refuse vehicle 10 (e.g., thermal events within refuse vehicle 10, etc.) and perform various operations based on the detection. For example, thermal event monitoring system 300 may operate fire suppression system 350 and/or external systems/devices 360. As an additional example, thermal event monitoring system 300 may alert one or more emergency response teams (e.g., a 911 operator, etc.). It should be understood that while thermal event monitoring system 300 is described in relation to refuse vehicle 10, thermal event monitoring system 300 is usable with other vehicles such as utility vehicles and/or mixers (e.g., concrete mixing truck 100, etc.). In various embodiments, thermal event monitoring system 300 is communicably coupled to sensor(s) 210, fire suppression system 350, and/or external systems/devices 360. Fire suppression system 350 may be associated with refuse vehicle 10 and/or a building associated with refuse vehicle 10. For example, fire suppression system 350 may be an onboard fire suppression system configured to suppress fires in refuse vehicle 10. As an additional example, fire suppression system 350 may be a fire suppression system for a garage where refuse vehicle 10 is parked when not in operation. In various embodiments, fire suppression system 350 is configured to suppress fires (e.g., via a fire sprinkler, etc.). External systems/devices 360 may include a fleet management system, a telematics system, an emergency response team, and/or the like. For example, thermal event monitoring system 300 may transmit data via telematics to a virtual refuse vehicle represented by external systems/devices 360.

Thermal event monitoring system 300 is shown to include processing circuit 310 and user interface 320. Processing circuit 310 may include processor 312 and memory 314. Processor 312 may be coupled to memory 314. Processor 312 may be a general purpose or specific purpose processor, an application specific integrated circuit (ASIC), one or more field programmable gate arrays (FPGAs), a group of processing components, or other suitable processing components. Processor 312 is configured to execute computer code or instructions stored in memory 314 or received from other computer readable media (e.g., CDROM, network storage, a remote server, etc.).

Memory 314 may include one or more devices (e.g., memory units, memory devices, storage devices, etc.) for storing data and/or computer code for completing and/or facilitating the various processes described in the present disclosure. Memory 314 may include random access memory (RAM), read-only memory (ROM), hard drive storage, temporary storage, non-volatile memory, flash memory, optical memory, or any other suitable memory for storing software objects and/or computer instructions. Memory 314 may include database components, object code components, script components, or any other type of information structure for supporting the various activities and information structures described in the present disclosure. Memory 314 may be communicably connected to processor 312 via processing circuit 310 and may include computer code for executing (e.g., by processor 312) one or more of the processes described herein.

Detection circuit 316 is configured to receive signals from sensor(s) 210 and detect the presence of a thermal event. A thermal event may include a fire, excess heat (e.g., an amount of heat above what would be expected for an area given the context, etc.), smoke, flames, and/or the like. In some embodiments, detection circuit 316 determines a thermal event using an algorithm. For example, detection circuit 316 may determine a thermal event using a rate-of-rise algorithm. Additionally or alternatively, detection circuit 316 may determine a thermal event using a threshold. For example, detection circuit 316 may determine the presence of a thermal event if a temperature of refuse compartment 30, or a region thereof, exceeds a threshold temperature (e.g., as determined by sensor(s) 210, etc.). In some embodiments, detection circuit 316 detects a location of a thermal event. For example, detection circuit 316 may determine a thermal event is located in a rear left portion of refuse compartment 30. In some embodiments, detection circuit 316 classifies thermal events. For example, detection circuit 316 may determine a risk associated with a thermal event. In various embodiments, in response to determining a thermal event, detection circuit 316 transmits an indication of the thermal event to alerting circuit 318.

Alerting circuit 318 is configured to perform one or more operations in response to receiving an indication of a thermal event. In some embodiments, alerting circuit 318 presents an indication of the thermal event to an operator of refuse vehicle 10. For example, alerting circuit 318 may control user interface 320 to display a warning to an operator of refuse vehicle 10. In some embodiments, alerting circuit 318 operates refuse vehicle 10. For example, alerting circuit 318 may operate a packer of tailgate 34 to smother a fire inside of refuse compartment 30. In some embodiments, alerting circuit 318 operates fire suppression system 350. For example, alerting circuit 318 may operate fire suppression system 350 to suppress a fire inside of refuse compartment 30. Additionally or alternatively, alerting circuit 318 may transmit one or more notifications. For example, alerting circuit 318 may transmit a notification of the thermal event and associated information (e.g., a location of refuse vehicle 10, etc.) to a fleet management system. As an additional example, alerting circuit 318 may transmit a notification of the thermal event and associated information to an emergency response team (e.g., a 911 operator, etc.). Additionally or alternatively, alerting circuit 318 may reroute refuse vehicle 10. For example, in the case of a fully-autonomous refuse vehicle, alerting circuit 318 may reroute refuse vehicle 10 to a safe location (e.g., a service location, a fire station, away from a densely populated area, etc.). As a further example, alerting circuit 318 may notify an operator of refuse vehicle 10 of the thermal event and may generate a GPS route to a safe location for the operator.

User interface 320 is configured to present information to and receive information from a user. In some embodiments, user interface 320 includes a display device (e.g., a monitor, a touchscreen, etc.). In some embodiments, user interface 320 includes an audio device (e.g., a microphone, a speaker, etc.). In various embodiments, user interface 320 receives alerts from alerting circuit 318 and presents the alerts to an operator of refuse vehicle 10. For example, user interface 320 may receive a visual alert from alerting circuit 318 and display a graphic on a display device to alert an operator of refuse vehicle 10 of a thermal event associated with refuse vehicle 10.

Figure 4:
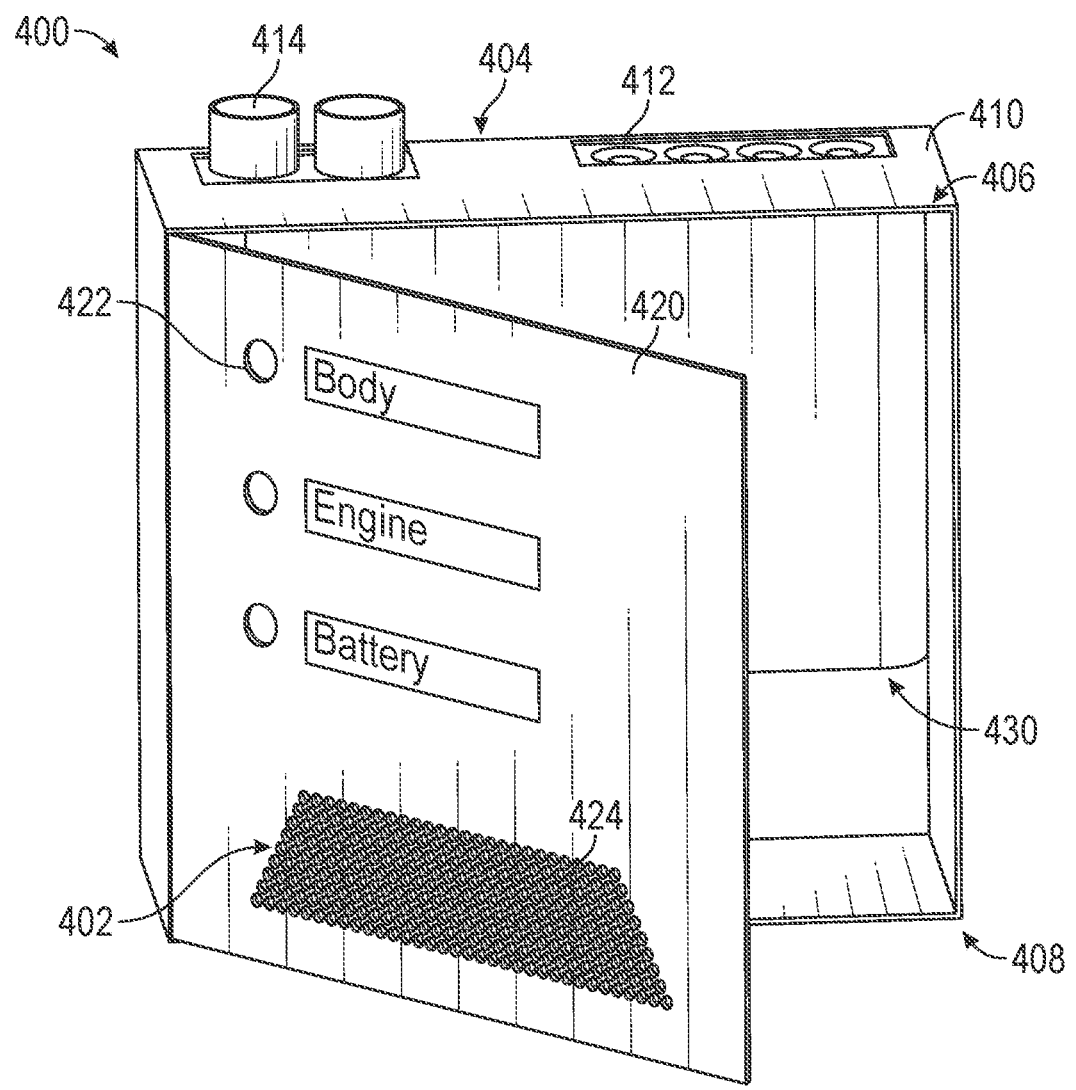
FIG. 4 is a perspective view of a housing for the thermal management system of FIG. 3, according to an exemplary embodiment.

Referring now to FIG. 4, housing 400 for thermal event monitoring system 300 or a component thereof is shown, according to an exemplary embodiment. Housing 400 may be positioned in cab 16 of refuse vehicle 10. For example, housing 400 may be integrated with a control console operable by an operator of refuse vehicle 10 within cab 16. In various embodiments, housing 400 is constructed of aluminum, steel, plastic, and/or a composite. However, it should be understood that housing 400 may be constructed of any material or a combination thereof. Housing 400 is shown to include front 402, back 404, top 406, and bottom 408. In various embodiments, housing 400 includes a number of panels coupled together to form an interior volume, shown as inside 430. A door, shown as access 420, may provide access to inside 430. In various embodiments, thermal event monitoring system 300 or a component thereof is positioned within inside 430. For example, a processing circuit of thermal event monitoring system 300 may be positioned within housing 400. In various embodiments, housing 400 includes one or more apertures, shown as power inlet 414 and sampling inlet 412. Sampling inlet 412 may include a hole to allow air sampling passage 220 to deliver sampled air to an aspirating smoke detector positioned within housing 400. Additionally or alternatively, sampling inlet 412 may allow passage of wiring 212 into housing 400. Power inlet 414 may provide routing for a power supply (e.g., an electrical wire carrying supply power, etc.) into housing 400.

In various embodiments, access 420 may include one or more indicators 422. Indicators 422 may include a light source such as a colored LED. In various embodiments, indicators 422 are associated with descriptive text. For example, an indicator 422 associated with a temperature status of an engine of refuse vehicle 10 may include the text "Engine." In various embodiments, indicators 422 provide visual status indications to a user. For example, an LED may be green to represent a normal status (e.g., a safe status, etc.), may flash yellow to indicate a warning status, and may flash red to indicate an unsafe status (e.g., a thermal event, etc.). In various embodiments, access 420 includes an auditory system, shown as speaker 424. Speaker 424 may provide audio feedback to a user. For example, speaker 424 may provide an audio alert when a thermal event is detected. In various embodiments, indicators 422 and/or speaker 424 are connected to thermal event monitoring system 300. For example, thermal event monitoring system 300 may control indicators 422 and/or speaker 424 based on monitoring refuse vehicle 10.

Figure 5:
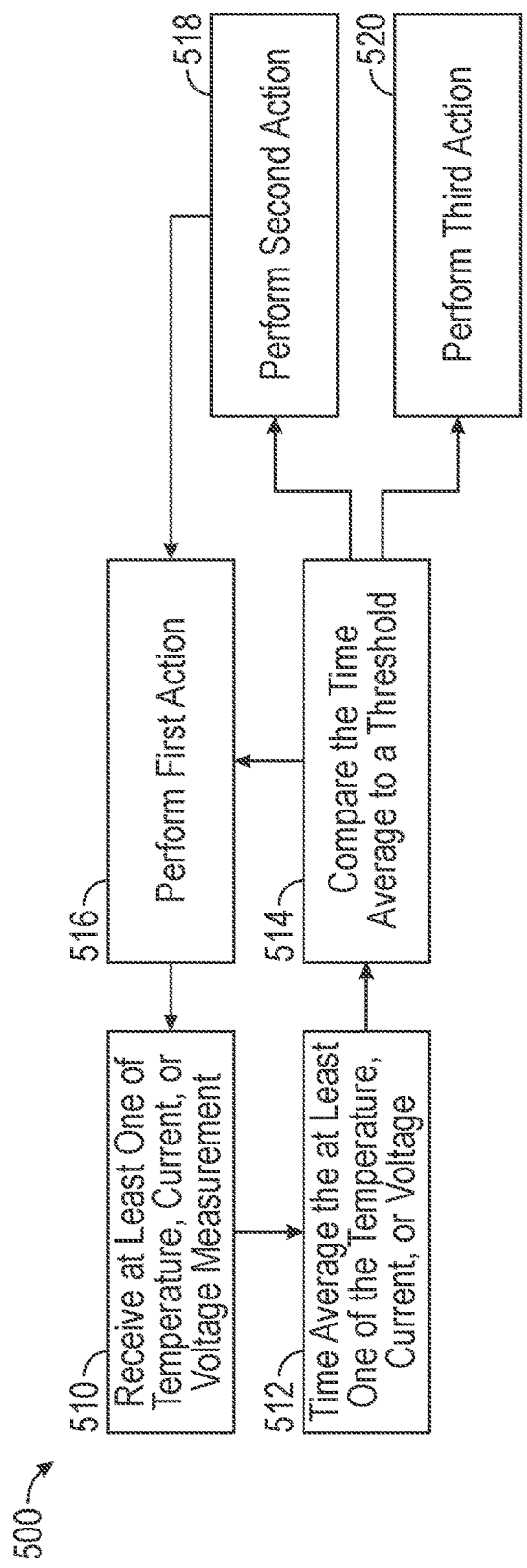
FIG. 5 is a flowchart of a method of thermal event monitoring for a battery, according to an exemplary embodiment.

Turning now to FIG. 5, method 500 for thermal event monitoring is shown, according to an exemplary embodiment. In various embodiments, thermal event monitoring system 300 performs method 500. In various embodiments, method 500 is used for battery monitoring. For example, thermal event monitoring system 300 may monitor one or more batteries of refuse vehicle 10 for a thermal event (e.g., as indicated by excess current, temperature, etc.). At step 510, thermal event monitoring system 300 may receive at least one of a temperature, current, or voltage measurement. In various embodiments, thermal event monitoring system 300 receives the at least one measurement from sensor(s) 210. For example, sensor(s) 210 may include a temperature and voltage probe positioned to monitor operation of a battery network of an electric refuse vehicle 10.

At step 512, thermal event monitoring system 300 time averages the at least one of the temperature, current, or voltage. For example, thermal event monitoring system 300 may compute a rolling mean for the last 30 measurements. At step 514, thermal event monitoring system 300 compares the time average to a threshold. For example, thermal event monitoring system 300 may compare a time average of a temperature measurement to a temperature threshold. In various embodiments, the threshold includes one or more ranges. For example, the threshold may include a first range from XA-XB and a second range from YA-YB (e.g., where XA, XB, YA, and YB represent temperature, current, and/or voltage values, etc.). In response to a first result of the comparison, thermal event monitoring system 300 may perform a first action (step 516). For example, in response to the time average temperature, current, and/or voltage being in a first range, thermal event monitoring system 300 may clear the stored measurements (e.g., reset the time average, etc.). In response to a second result of the comparison, thermal event monitoring system 300 may perform a second action (step 518). For example, in response to the time average temperature, current, and/or voltage being in a second range, thermal event monitoring system 300 may generate a first notification to a user such as blinking a yellow LED (e.g., of housing 400, etc.). In response to a third result of the comparison, thermal event monitoring system 300 may perform a third action (step 520). For example, in response to the time average temperature, current, and/or voltage being in a third range, thermal event monitoring system 300 may generate a second notification to a user such as a blinking red LED and sounding an audio alarm. Additionally or alternatively, steps 516, 518, and/or 520 may include transmitting a notification such as an alert to a vehicle management system. In various embodiments, method 500 repeats. For example, after step 520, thermal event monitoring system 300 may perform step 510.

Figure 6:
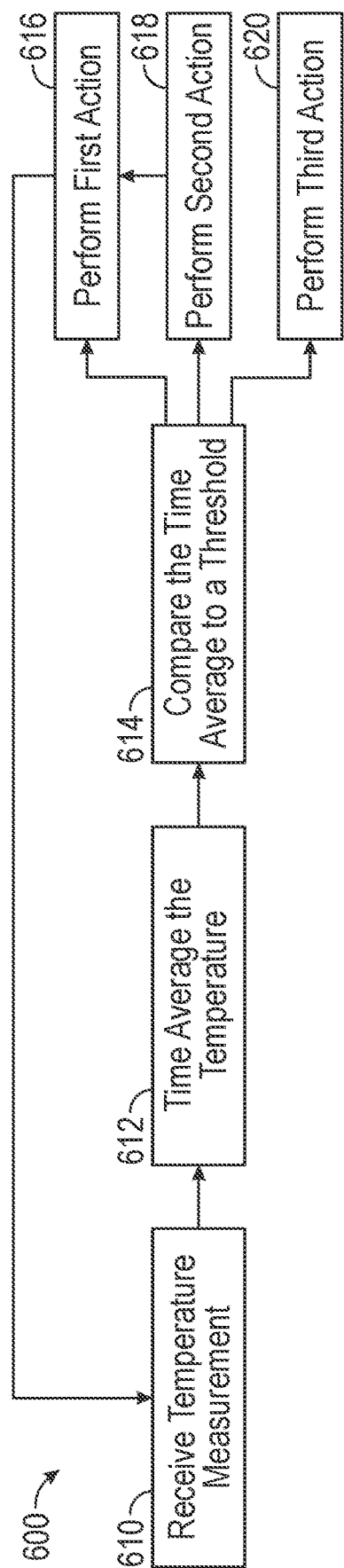
FIG. 6 is a flowchart of a method of thermal event monitoring for an engine, according to an exemplary embodiment.

Turning now to FIG. 6, method 600 for thermal event monitoring is shown, according to an exemplary embodiment. In various embodiments, thermal event monitoring system 300 performs method 600. In various embodiments, method 600 is used for engine monitoring. For example, thermal event monitoring system 300 may monitor one or more components of an engine of refuse vehicle 10 for a thermal event (e.g., as indicated by excess temperature, etc.). At step 610, thermal event monitoring system 300 may receive a temperature measurement. In various embodiments, thermal event monitoring system 300 receives the at least one measurement from sensor(s) 210. For example, sensor(s) 210 may include a temperature probe positioned to monitor operation of an engine of refuse vehicle 10.

At step 612, thermal event monitoring system 300 time averages the temperature. For example, thermal event monitoring system 300 may compute a rolling mean for the last 30 measurements. At step 614, thermal event monitoring system 300 compares the time average to a threshold. For example, thermal event monitoring system 300 may compare a time average of a temperature measurement to a temperature threshold. In various embodiments, the threshold includes one or more ranges. In response to a first result of the comparison, thermal event monitoring system 300 may perform a first action (step 616). For example, in response to the time average temperature being in a first range (e.g., below 300° F., etc.), thermal event monitoring system 300 may clear the stored measurements (e.g., reset the time average, etc.). In response to a second result of the comparison, thermal event monitoring system 300 may perform a second action (step 618). For example, in response to the time average temperature being in a second range (e.g., between 300° F. and 350° F., etc.), thermal event monitoring system 300 may generate a first notification to a user such as blinking a yellow LED (e.g., of housing 400, etc.). In response to a third result of the comparison, thermal event monitoring system 300 may perform a third action (step 620). For example, in response to the time average temperature being in a third range (e.g., at or above 350° F., etc.), thermal event monitoring system 300 may generate a second notification to a user such as a blinking red LED and sounding an audio alarm. Additionally or alternatively, steps 616, 618, and/or 620 may include transmitting a notification such as an alert to a vehicle management system. In various embodiments, method 600 repeats. For example, after step 620, thermal event monitoring system 300 may perform step 610.

Figure 7:
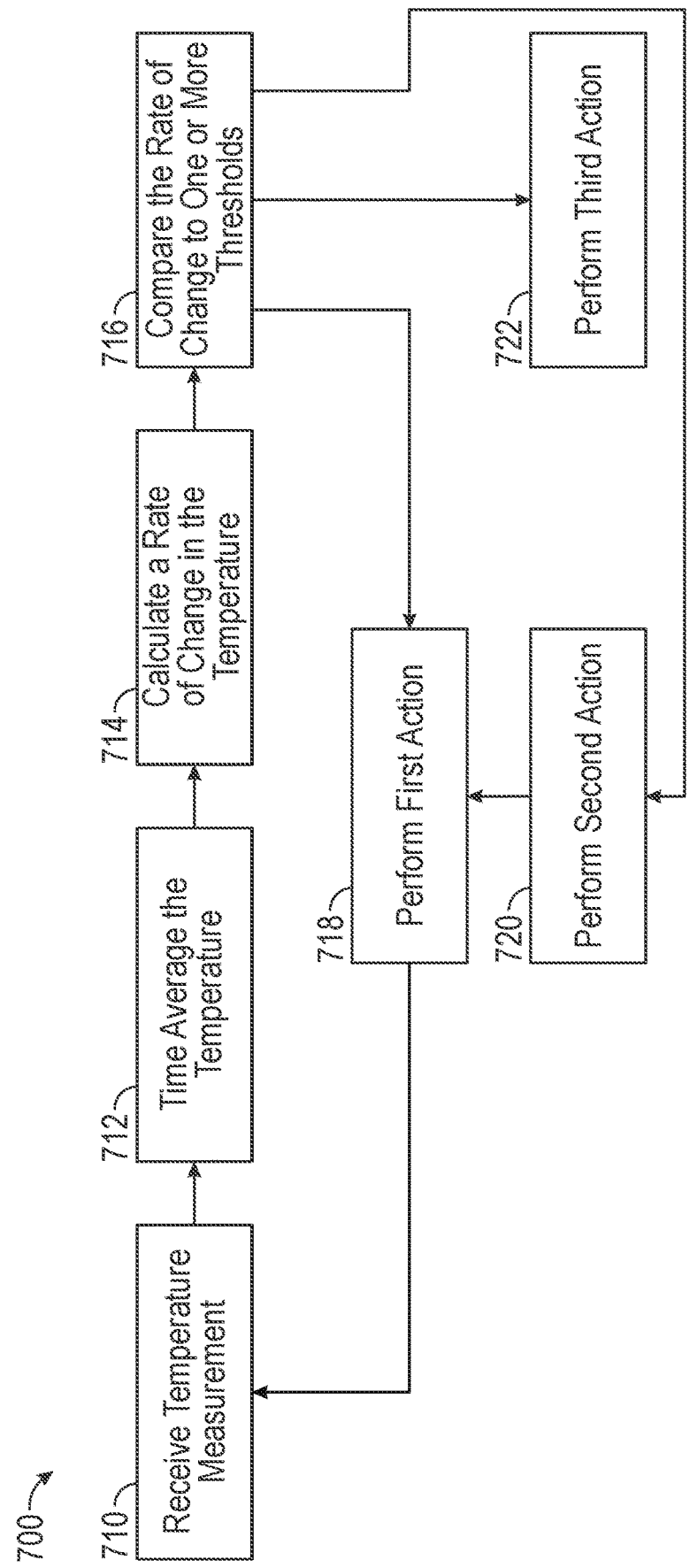
FIG. 7 is a flowchart of a method of thermal event monitoring for a body of a refuse vehicle, according to an exemplary embodiment.

Turning now to FIG. 7, method 700 for thermal event monitoring is shown, according to an exemplary embodiment. In various embodiments, thermal event monitoring system 300 performs method 700. In various embodiments, method 700 is used for monitoring a body of refuse vehicle 10, such as refuse compartment 30. For example, thermal event monitoring system 300 may monitor refuse compartment 30 for a thermal event (e.g., as indicated by excess temperature, etc.). At step 710, thermal event monitoring system 300 may receive a temperature measurement. In various embodiments, thermal event monitoring system 300 receives the measurement from sensor(s) 210. For example, sensor(s) 210 may include a temperature probe positioned to monitor an interior of refuse compartment 30 of refuse vehicle 10.

At step 712, thermal event monitoring system 300 time averages the temperature. For example, thermal event monitoring system 300 may compute a rolling mean for the last 30 measurements. At step 714, thermal event monitoring system 300 may calculate a rate of change in the time averaged temperature. For example, thermal event monitoring system 300 may determine that a temperature average for a first time period is 50° F. and a temperature average for a second time period is 60° F. and may determine that the rate of change is 10° F./time elapsed between first period and second period. At step 716, thermal event monitoring system 300 compares the rate of change to one or more thresholds. For example, thermal event monitoring system 300 may compare the temperature rate of change to a rate of change threshold. In various embodiments, the threshold includes one or more ranges. In response to a first result of the comparison, thermal event monitoring system 300 may perform a first action (step 718). For example, in response to the rate of change being below a first threshold, thermal event monitoring system 300 may clear the stored measurements (e.g., reset the time average and/or the rate of change, etc.). In response to a second result of the comparison, thermal event monitoring system 300 may perform a second action (step 720). For example, in response to the rate of change being between the first threshold and a second threshold, thermal event monitoring system 300 may generate a first notification to a user such as blinking a yellow LED (e.g., of housing 400, etc.). In response to a third result of the comparison, thermal event monitoring system 300 may perform a third action (step 722). For example, in response to the rate of change being above the second threshold, thermal event monitoring system 300 may generate a second notification to a user such as a blinking red LED and sounding an audio alarm. Additionally or alternatively, steps 718, 720, and/or 722 may include transmitting a notification such as an alert to a vehicle management system. In various embodiments, method 700 repeats. For example, after step 722, thermal event monitoring system 300 may perform step 710.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle, comprising:
a chassis;
a body assembly coupled to the chassis, the body assembly defining a refuse compartment; and
a thermal event monitoring system comprising:
an air sampling line configured to capture air from the refuse compartment of the refuse vehicle and transport the air to a sensor positioned outside of the refuse compartment; and
a processing circuit operatively coupled to the sensor and configured to detect a thermal event indicating at least one of a fire or an overheating component based on a signal from the sensor.

2. The refuse vehicle of claim 1, further comprising a user interface operatively coupled to the processing circuit, wherein the processing circuit is further configured to send an alert to an operator of the refuse vehicle via the user interface upon determining the presence of a thermal event.

3. The refuse vehicle of claim 1, wherein the thermal event monitoring system further includes an air purge system configured to provide compressed air to the air sampling line to clear debris from at least one of an inside of the air sampling line or a sampling opening of the air sampling line.

4. The refuse vehicle of claim 3, wherein the sensor is configured to analyze the air to detect the thermal event.

5. The refuse vehicle of claim 1, wherein the thermal event monitoring system further comprises a temperature sensor operatively coupled to the processing circuit and configured to measure at least one of an air temperature or a temperature of a surface the temperature sensor is coupled to.

6. The refuse vehicle of claim 5, wherein the temperature sensor is positioned in the refuse compartment.

7. The refuse vehicle of claim 5, wherein the temperature sensor includes a resistance temperature detector (RTD) configured to measure a temperature associated with the refuse compartment.

8. The refuse vehicle of claim 5, wherein the temperature sensor is positioned between a cab of the refuse vehicle and the refuse compartment.

9. The refuse vehicle of claim 1, wherein the thermal event monitoring system further comprises a plurality of temperature sensors positioned in the refuse compartment and operatively coupled to the processing circuit, and wherein the processing circuit is further configured to determine a location of the thermal event based on measurements from the plurality of temperature sensors.

10. The refuse vehicle of claim 1, further comprising a packer configured to compact loose refuse, wherein the processing circuit is further configured to operate the packer to smother the fire in response to determining a presence of a fire in the refuse compartment.

11. A thermal event monitoring system for a refuse vehicle, comprising:
   an air sampling line configured to capture air from the refuse compartment of the refuse vehicle and transport the air to a sensor positioned outside of the refuse compartment of the refuse vehicle; and
   a processing circuit comprising a processor and memory, the memory having instructions stored thereon that, when executed by the processor, cause the processing circuit to:
      receive a signal from the sensor regarding the air; and
      detect a thermal event indicating at least one of a fire or an overheating component based on the signal from the sensor.

12. The thermal event monitoring system of claim 11, wherein the instructions further cause the processing circuit to alert an operator of the refuse vehicle of the thermal event via a user interface of the refuse vehicle.

13. The thermal event monitoring system of claim 11, further comprising an air purge system configured to provide compressed air to the air sampling line to clear debris from at least one of an inside of the air sampling line or a sampling opening of the air sampling line.

14. The thermal event monitoring system of claim 11, further comprising a temperature sensor configured to measure at least one of an air temperature or a temperature of a surface the temperature sensor is coupled to.

15. The thermal event monitoring system of claim 14, wherein the temperature sensor includes a resistance temperature detector (RTD) positioned to measure a temperature associated with the refuse compartment.

16. The thermal event monitoring system of claim 14, wherein the temperature sensor is positioned between a cab of the refuse vehicle and the refuse compartment.

17. The thermal event monitoring system of claim 11, further comprising a plurality of temperature sensors operatively coupled to the processing circuit, and wherein the instructions further cause the processing circuit to determine a location of the thermal event based on measurements from the plurality of temperature sensors.

18. The thermal event monitoring system of claim 11, wherein the instructions further cause the processing circuit to detect the thermal event based on a rate of change in the signal from the sensor.

19. The thermal event monitoring system of claim 11, wherein the instructions further cause the processing circuit to detect the thermal event based on the signal exceeding a predetermined threshold value.

20. The thermal event monitoring system of claim 11, wherein the instructions further cause the processing circuit to send a message, in response to determining the presence of a fire, instructing a packer of the refuse vehicle to smother the fire.

* * * * *